April 18, 1939.  E. N. ANKETELL  2,154,653

BATTERY HOLDER

Filed Dec. 11, 1936

Inventor
Edward N. Anketell
By Rockwell Bartholow
Attorneys

Patented Apr. 18, 1939

2,154,653

UNITED STATES PATENT OFFICE 2,154,653

BATTERY HOLDER

Edward N. Anketell, New Haven, Conn., assignor to The A. C. Gilbert Company, New Haven, Conn., a corporation of Maryland Application December 11, 1936, Serial No. 115,373

2 Claims. (Cl. 136—171)

This invention relates to battery holders, and more particularly to a container or holder for an electric battery consisting of dry cells, whereby the current from the battery may be used for any desired purpose.

The invention also relates particularly to battery holders for use with toy sets, wherein certain devices such as light bulbs, small motors, and toys of various kinds are designed to be operated by a battery current of low voltage. It is very convenient for use in connection with toy sets from which various devices may be constructed which are to be used with an electric current, or which may contain various devices with which an electric current is designed to be used, to provide a holder or container in which one or more dry cells may be held, and which holder is provided with conducting leads designed to be connected with the electrical device, and a switch to control the passage of the current through these leads from the battery.

One object of the invention is to provide a simple and convenient device for holding a dry cell battery of such a character that it may be economically made and at the same time may be provided with a simple type of switch.

A still further object of the invention is the provision of a battery holder which may be economically made of sheet metal, for example, and provided with a convenient type of switch to control the passage of current from the battery, and which will be so constructed that the cells may be readily placed in the holder and removed therefrom.

To these and other ends the invention consists in the novel features and combinations of parts to be hereinafter described and claimed.

Figure 1:
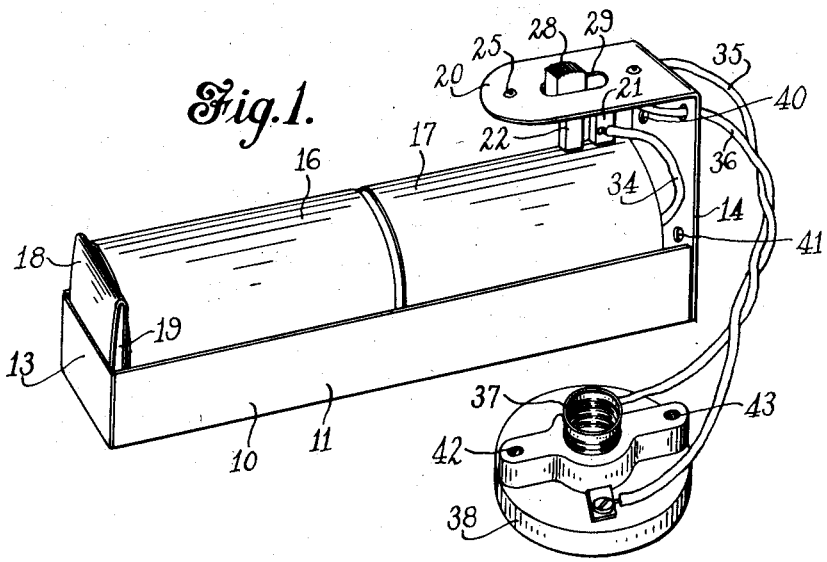
Fig. 1 is a perspective view of a battery holder embodying my invention.

To illustrate a preferred embodiment of my invention, I have shown a battery holder 10 of substantially rectangular shape, the holder as shown comprising side members 11 and 12, end members 13 and 14, and a bottom member 15. The top is left open so that the cells 16 and 17 comprising the battery may be readily placed in the holder and removed therefrom. It will be understood, of course, that the holder 10 may be made of such length that it may be adapted to only one cell or to as many as it is desired to use, the cells being connected in series, as is usual.

Secured to the rear end member 13 is a U-shaped spring 18, the free end 19 of which is adapted to contact with the bottom portion of the metal case of the rear cell so as to be in the electrical circuit when the latter is closed. That is, the member 18 is a spring contact member, establishing contact between the metal container of the cell and the holder 10 of the battery, which holder is preferably made of sheet metal.

The front end 14 of the holder is considerably higher than the rear end so as to extend upwardly above the cells of the battery, and at its upper end the member 14 is provided with a rearwardly turned portion, so that the front end member of the holder is of inverted L-shape. This portion 20 will generally extend in a horizontal direction, as the battery holder normally rests upon the base or bottom portion 15.

Secured to the under side of the horizontally extending portion 20 of the holder, is a switch to control the passage of current from the battery. This switch may comprise a pair of electrical contacts 21 and 22 secured to an insulating member 23, which is supported from a plate 24, this plate being in turn secured to the member 20 by the screws 25. The contacts 21 and 22 are designed to be electrically connected by means of a slidably movable switch member 26 resting upon the upper surface of the member 23. The member 26 is connected to a plate 27 having a manually engageable part 28 projecting upwardly through the slot 29 in the member 20. A coil spring 30 mounted within the member 28 serves to urge the switch member 26 downwardly against the upper ends of the contacts 21 and 22.

The front end 14 of the battery holder is provided with a contact post 31 designed to contact with the central electrode 32 of the adjacent dry cell, this electrode, as usual, being one of the battery terminals. The contact post 31 is insulated from the case by means of the washers 33, and a conducting wire 34 leads from this contact post to the contact member 21 of the switch. Likewise, a conducting lead wire 35 leads from the other contact member 22 of the switch outwardly through an opening in the member 14, so that it may be connected to the electrical device which is to be operated from the battery. The second lead 36 is secured by soldering or the like to some part of the holder, as for example, the under side of the member 20, as shown at 36a, and passes outwardly through an opening in the end member 14.

The leads 35 and 36 may be secured to any suitable electrical device. As shown in Fig. 1, they are connected to the terminals of a light socket 37 supported by the base 38. It will be understood that the lead 36 is connected directly to the part 20 of the holder, and therefore receives the current through the body of the holder from the spring contact member 18, which makes contact with the base of the metallic container of one of the cells. The other lead 35 receives its current from the central electrode 32 of the cell, as controlled by the switch secured to the switch-supporting member 20.

Figure 2:
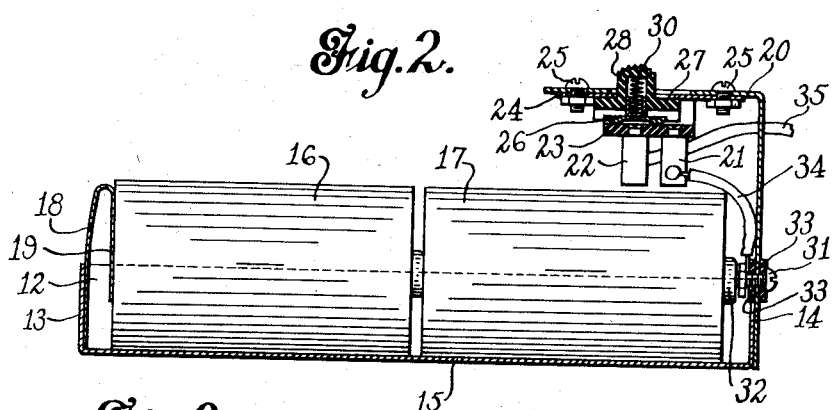
Fig. 2 is a longitudinal sectional view of the holder.
Figure 3:
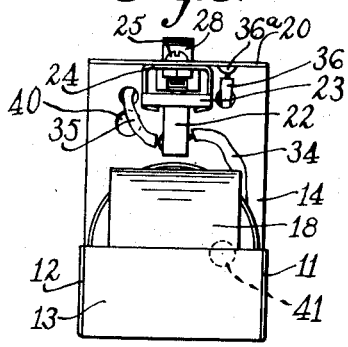
Fig. 3 is an end view of the same.

As shown in Figs. 1 and 2, the switch is in the "off" position. It will be readily understood, however, that the member 28 may be engaged by the finger and moved to the right so that the member 26 will engage both contact members 21 and 22 and therefore close the circuit between these members, thus completing the circuit through the leads 35 and 36 when these leads are connected to an electrical device.

Figure 4:
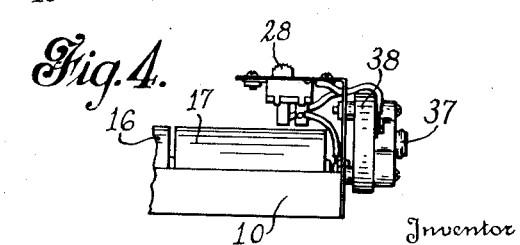
Fig. 4 is a fragmentary view showing another use of the battery holder.

It will be noted that the front end member 14 is provided with openings 40 and 41. These openings make it possible to attach devices to the front of the holder, such, for example, as the base 38 of the light socket 37, as shown in Fig. 4. This member may be secured in place by passing bolts through the openings 42 and 43 in the base 38 and the openings 40 and 41 in the end member. A light bulb can be placed in the socket 37, and the holder may then be used as a flashlight, the switch 28 controlling the lighting of the bulb. Other uses than those described will, of course, readily suggest themselves.

While I have shown and described a preferred embodiment of my invention, it will be understood that it is not to be limited to all of the details shown, but is capable of modification and variation within the spirit of the invention and within the scope of the appended claims.

What I claim is:

1. A battery holder comprising a sheet metal container of substantially rectangular shape and having a flat bottom upon which the container rests in a horizontal position, said container being open at its upper side to receive one or more battery cells in a horizontal position, a metallic spring member secured upon one of the ends of the container and making electrical contact therewith and extending inwardly to make contact with the case of the adjacent cell, a contact post mounted in the opposite end member of the container and insulated therefrom, said contact post making contact with the electrode of the adjacent cell, the last-named end member of said container being extended upwardly beyond the container sides and having a portion turned horizontally inwardly over the adjacent battery cell and in spaced relation therewith, a switch supported at the under side of said horizontal portion, a conductor connecting said contact post with one terminal of said switch, a conductor leading from the container connected to the other terminal of the switch, and a second conductor leading from the container and being electrically connected thereto.

2. A battery holder comprising a sheet metal container of substantially rectangular shape and having a flat bottom upon which the container rests in a horizontal position, said container being open at its upper side to receive one or more battery cells in a horizontal position, a metallic spring member secured upon one of the ends of the container and making electrical contact therewith and extending inwardly to make contact with the case of the adjacent cell, a contact post mounted in the opposite end member of the container and insulated therefrom, said contact post making contact with the electrode of the adjacent cell, the last-named end member of said container being extended upwardly beyond the container sides and having a portion turned horizontally inwardly over the adjacent battery cell and in spaced relation therewith, a switch supported at the under side of said horizontal portion, a conductor connecting said contact post with one terminal of said switch, a conductor leading from the container connected to the other terminal of the switch, a second conductor leading from the container and being electrically connected thereto, said horizontally turned portion being provided with a slot, and a switch-operating member movably carried by said portion and having a part extending through said slot to be accessible at the upper side of said portion.

EDWARD N. ANKETELL.